(12) United States Patent
Wilson et al.

(10) Patent No.: US 9,187,833 B2
(45) Date of Patent: Nov. 17, 2015

(54) INTERNALLY-REINFORCED WATER ELECTROLYSER MODULE

(71) Applicant: Next Hydrogen Corporation, Mississauga (CA)

(72) Inventors: Chris Wilson, Port Perry (CA); Michael Stemp, Toronto, CA (US); James Hinatsu, Mississauga (CA)

(73) Assignee: Next Hydrogen Corporation (CA)

( * ) Notice: Subject to any disclaimer, the term of this patent is extended or adjusted under 35 U.S.C. 154(b) by 343 days.

(21) Appl. No.: 13/757,418

(22) Filed: Feb. 1, 2013

(65) Prior Publication Data

US 2014/0069807 A1   Mar. 13, 2014

Related U.S. Application Data

(60) Provisional application No. 61/700,534, filed on Sep. 13, 2012.

(51) Int. Cl.
*C25B 9/20* (2006.01)
*C25B 1/08* (2006.01)

(52) U.S. Cl.
CPC . *C25B 1/08* (2013.01); *C25B 9/206* (2013.01); *Y02E 60/366* (2013.01)

(58) Field of Classification Search
None
See application file for complete search history.

(56) References Cited

U.S. PATENT DOCUMENTS

| | | | |
|---|---|---|---|
| 2,075,688 A | 3/1937 | Zdansky | |
| 2,683,116 A | 7/1954 | Zdansky | |
| 4,204,939 A | 5/1980 | Boulton et al. | |
| 4,379,051 A * | 4/1983 | Hiesinger et al. | 210/193 |
| 4,465,570 A | 8/1984 | Oda et al. | |
| 4,643,827 A * | 2/1987 | Becker | 210/228 |
| 4,758,322 A | 7/1988 | Sioli | |
| 5,512,145 A | 4/1996 | Hollenberg | |
| 5,592,028 A | 1/1997 | Pritchard | |
| 6,153,083 A | 11/2000 | Hofmann et al. | |
| 6,554,978 B1 | 4/2003 | Vandenborre | |
| 6,645,659 B2 | 11/2003 | Bisaka et al. | |
| 6,864,596 B2 | 3/2005 | Maiwald et al. | |
| 6,912,450 B2 | 6/2005 | Fairlie et al. | |
| 6,956,300 B2 | 10/2005 | Gizara | |

(Continued)

FOREIGN PATENT DOCUMENTS

| | | | |
|---|---|---|---|
| GB | 493605 A | * | 10/1938 |
| JP | 57094579 A | | 6/1982 |

(Continued)

OTHER PUBLICATIONS

F. Vitse, M. Cooper and G.G. Botte, "On the use of ammonia electrolysis for hydrogen production", J. Power Sources 142, (2005) 18.

(Continued)

*Primary Examiner* — Harry D Wilkins, III
(74) *Attorney, Agent, or Firm* — Harness, Dickey & Pierce, P.L.C.

(57) ABSTRACT

A structural plate is provided for an electrolyzer module. The structural plate defines at least one degassing chamber and a half cell chamber opening. The structural plate is reinforced with at least one internal reinforcing means mounted to the structural plate for mitigating outward displacement of the structural plate in response to fluid pressure within the structural plate. The structural plate defines holding features for locating and holding the internal reinforcing means.

14 Claims, 6 Drawing Sheets

(56) References Cited

U.S. PATENT DOCUMENTS

| | | |
|---|---|---|
| 7,060,379 B2 | 6/2006 | Speranza et al. |
| 7,062,360 B2 | 6/2006 | Fairlie et al. |
| 7,075,189 B2 | 7/2006 | Heronemus et al. |
| 7,088,012 B2 | 8/2006 | Gizara |
| 7,199,482 B2 | 4/2007 | Hopewell |
| 7,245,039 B2 | 7/2007 | DuHamel |
| 7,314,539 B2 | 1/2008 | Brand et al. |
| 7,332,063 B2 | 2/2008 | Sioli |
| 7,353,085 B2 | 4/2008 | Rusta-Sallehy et al. |
| 7,397,142 B1 | 7/2008 | Cooper |
| 7,759,812 B2 | 7/2010 | Taylor et al. |
| 7,892,407 B2 | 2/2011 | Gibson et al. |
| 7,906,007 B2 | 3/2011 | Gibson et al. |
| 8,003,268 B2 | 8/2011 | Smith |
| 8,308,917 B2 | 11/2012 | Hinatsu et al. |
| 2002/0033332 A1 | 3/2002 | Handa |
| 2004/0131902 A1 | 7/2004 | Frank et al. |
| 2005/0044853 A1 | 3/2005 | Yoshino |
| 2005/0121334 A1 | 6/2005 | Sumita |
| 2005/0165511 A1 | 7/2005 | Fairlie |
| 2006/0065302 A1 | 3/2006 | Gibson et al. |
| 2006/0208571 A1 | 9/2006 | Fairlie |
| 2007/0001461 A1 | 1/2007 | Hopewell |
| 2007/0026283 A1 | 2/2007 | LaConti et al. |
| 2007/0215492 A1 | 9/2007 | Vandenborre |
| 2007/0246943 A1 | 10/2007 | Chang et al. |
| 2008/0047502 A1 | 2/2008 | Morse |
| 2008/0083614 A1 | 4/2008 | Swalla et al. |
| 2008/0121525 A1 | 5/2008 | Doland |
| 2008/0127646 A1 | 6/2008 | Doland |
| 2009/0229990 A1 | 9/2009 | Hinatsu et al. |
| 2010/0012503 A1 | 1/2010 | Hinatsu et al. |
| 2010/0065513 A1* | 3/2010 | Hibble .................... 210/767 |
| 2011/0042228 A1 | 2/2011 | Hinatsu et al. |

FOREIGN PATENT DOCUMENTS

| | | | |
|---|---|---|---|
| JP | 07233493 A | 9/1995 |
| JP | 2002371396 A | 12/2002 |
| JP | 2003317763 A | 11/2003 |
| JP | 2005330515 A | 12/2005 |
| JP | 2006345649 A | 12/2006 |
| WO | 9528510 A1 | 10/1995 |
| WO | 9832900 A1 | 7/1998 |
| WO | 9940030 A2 | 8/1999 |
| WO | 2006060912 A1 | 6/2006 |
| WO | 2010006423 A1 | 1/2010 |

OTHER PUBLICATIONS

International Search Report (in English), Written Opinion of International Searching Authority (in English) for PCT/CA2009/000960, ISA/CA mailed Oct. 2, 2009.

M. Kondoh, et al., "Development of solid polymer-electrolyte water electrolyse" Journal of New Materials for Electrochemical Systems 3 (2000) pp. 61-65.

Notification Concerning Transmittal of International Preliminary Report on Patentability for PCT/CA2009/000960 (Jan. 27, 2011).

Notification of Transmittal of the International Search Report and the Written Opinion for PCT/CA2009/001530 (Jan. 29, 2010).

Office Action received in related Chinese patent application and English translation (Feb. 22, 2012).

S. Stucki, et al. "PEM water electrolysers: evidence for membrane failure in 100kW demonstration plants", Journal of Applied Electrochemistry 28 (1998) 1041-1049.

Written Opinion of the International Searching Authority, PCT/CA2010/001161, pp. 1-7, (Nov. 10, 2010), and Transmittal of the International Search Report for PCT/CA2010/001161, pp. 1-5 (Nov. 10, 2010).

* cited by examiner

INTERNALLY-REINFORCED WATER ELECTROLYSER MODULE

CROSS-REFERENCE TO RELATED APPLICATION

This application claims the benefit of U.S. Provisional Application No. 61/700,534 filed on Sep. 13, 2012. The disclosure of the above application is herein incorporated by reference.

FIELD OF THE INVENTION

The present invention relates to the design of water electrolysers for the production of hydrogen and oxygen gases at elevated pressures, and more particularly, to alkaline and polymer electrolyte membrane (PEM) type electrolyser stacks and electrolyser modules capable of operation at high pressures, and components therefor.

BACKGROUND OF THE INVENTION

Electrolysers use electricity to transform reactant chemicals to desired product chemicals through electrochemical reactions, i.e., reactions that occur at electrodes that are in contact with an electrolyte. Hydrogen is a product chemical of increasing demand for use in chemical processes, and also potentially for use in hydrogen vehicles and equipment powered by hydrogen fuel cell engines or hydrogen internal combustion engines (or hybrid hydrogen vehicles, also partially powered by batteries). Water electrolysers, which produce hydrogen and oxygen from water and electricity, are the most common type of electrolyser used for production of gaseous hydrogen as the main product. The most common types of commercial water electrolysers are alkaline water electrolysers (AWE) and polymer electrolyte membrane (PEM) water electrolysers.

As used herein, the terms "half cell", "half electrolysis cell" and equivalent variations thereof refer to a structure comprising one electrode and its corresponding half cell chamber that provides space for gas-liquid (or gas) flow out of the half cell. The term "cathode half cell" refers to a half cell containing a cathode, and the term "anode half cell" refers to a half cell containing an anode.

As used herein, the terms "cell", "electrolysis cell" and equivalent variations thereof refer to a structure comprising a cathode half cell and an anode half cell. A cell also includes a separator membrane (referred to herein after as a "membrane"), typically located between, and in close proximity to, in contact with, or integral with, the cathodes and anodes. The functionality of the membrane is to maintain the hydrogen and oxygen gases produced separate and of high purity, while allowing for ionic conduction of electricity between the anode and cathode. A membrane therefore defines one side of each half cell. The other side of each half cell is defined by an electronically conducting solid plate, typically comprised of metal, carbon, carbon-polymer composite, or combinations thereof, and generally known as a bipolar plate. The functionality of the bipolar plate is to maintain the fluids in adjacent half cell chambers of adjacent cells separate, while conducting current electronically between the adjacent cells. Each half cell chamber also contains an electronically conducting component generally known as a current collector or current carrier, to conduct current across the half cell chamber, between the electrode and the bipolar plate.

As used herein, the terms "cell stack", "electrolyser stack", "stack", or equivalent variations thereof refer to structures used for practical (commercial) water electrolysers comprising multiple cells, in which the cells typically are electrically connected in series (although designs using cells connected in parallel and/or series also are known), with bipolar plates physically separating but providing electrical communication between adjacent cells. Gas-liquid (i.e., hydrogen-liquid and oxygen-liquid) mixtures are collected from individual half-cells in header flow passages (top flow manifolds), which run lengthwise along the stack, above the cells. The header flow passages fluidly communicate with respective gas-liquid discharge passages extending through the electrolyser stack and in fluid communication with external piping or tubing, which in turn fluidly communicate with external gas-liquid separation vessels. Operations performed in the external gas-liquid separation vessels include gas-liquid separation, and optionally feed water addition and liquid mixing. Degassed liquid is returned to the cell stack via external piping or tubing, which is in fluid communication with respective degassed liquid return passages extending through the electrolyser stack. Degassed liquid is distributed to individual half-cells via footer flow passages (bottom flow manifolds), which run lengthwise along the stack, underneath the cells. In some PEM electrolyser stacks, the hydrogen side is operated without circulating liquid, in which case the hydrogen side header flow passage(s) and discharge passage(s) would carry hydrogen gas, and in which case there would be no requirement for a gas-liquid separation circuit on the hydrogen side.

As used herein, the term "electrolyser module" refers to the combination of an electrolyser stack and gas-liquid separation spaces in the same structure, which typically is of the filter press type. Further, the term "electrolyser module" as used herein may refer to an alkaline electrolyser module or a PEM electrolyser module. We previously disclosed designs for an alkaline electrolyser module in U.S. Pat. No. 8,308,917, and for a PEM electrolyser module in US 2011/0042228, both of which are incorporated herein by reference.

As used herein, the term "structural plate" refers to a body having a sidewall extending between opposite end faces with a half cell chamber opening, and in the case of an electrolyser module, additionally at least one degassing chamber opening extending through the structural plate between the opposite end faces. An electrolyser stack or an electrolyser module typically is constructed using a series of structural plates to define alternately cathode and anode half cell chambers, fluid flow passages, and in the case of an electrolyser module, at least one degassing chamber, and respective gas-liquid flow passages and respective degassed liquid flow passages extending between the one or more degassing chambers and the corresponding half cell chambers. The structural plates are arranged in face to face juxtaposition between opposite end pressure plates, optionally with at least one intermediate pressure plate interspersed between the structural plates along a length of the electrolyser stack or electrolyser module, to form a filter press type structure. The end pressure plates and intermediate pressure plates can be made of, e.g., one or more of steel, stainless steel, nickel-plated steel, nickel-plated stainless steel, nickel and nickel alloy. The structural plates also hold functional components, which may include, for example, cathodes, anodes, separator membranes, current collectors, and bipolar plates, in their appropriate spatial positions and arrangement.

The structural plates are made of a suitable electrically insulating plastic or fiber-reinforced plastic that is inert to electrolyte (e.g., in the case of an alkaline electrolyser module, an aqueous solution of 25% to 35% KOH at elevated temperatures) or water (in the case of a PEM electrolyser module) and gases (e.g., oxygen, hydrogen, nitrogen).

Examples of suitable plastics include polyoxymethylene (POM), polypropylene, polyphenylene oxide (PPO), polyphenylene sulphide (PPS) and the like, and in particular, polysulfone. The structural plates are manufactured by processes such as machining, and more preferably, injection molding, sometimes with some post-machining. Thus, the plates are lightweight, non-conducting, resistant to the operating environment, and amenable to simple and relatively low cost fabrication.

Generally contemplated operating pressures of electrolyser modules and electrolyser stacks lie between atmospheric pressure and 30 barg, and more typically up to 10 barg, depending on the application requirements. Higher pressure operation, for example, in the range of 17 to 30 barg, is advantageous as it enables direct filling of commonly-used gas storage vessels, or a reduced number of mechanical compression stages when filling higher pressure storage. Older electrolyser stack designs utilized steel structural plates, which enabled operation at elevated pressures, e.g., 30 barg, but presented other challenges, such as very high weight, the need for electrical insulation, and potential for corrosion. For modern, "advanced" electrolyser stack and electrolyser module designs utilizing structural plates made of polymeric materials, higher pressure operation presents challenges with regard to mechanical integrity of the structural plates, especially over the long term and for large scale electrolyser modules and electrolyser stacks. External pressure containment means, such as a pressure vessel or a load bearing reinforcing support surrounding an electrolyser stack are known in the art (e.g., U.S. Pat. No. 6,153,083, U.S. Pat. No. 7,314,539), but preferably are to be avoided in order to maintain inherent design simplicity, ease of implementation, compactness, lightweight, and low capital cost. The structural plates could be made significantly more massive, but this approach is impractical and also preferably to be avoided, due to correspondingly significantly increased cost, size, weight, and difficulty of injection molding. The approach of reinforcing each structural plate may be preferred if it can be implemented simply, without significantly adverse effects on ease of assembly, compactness, weight and cost.

U.S. Pat. No. 7,332,063 discloses an approach to reinforcement of individual structural plates in an electrolyser stack in which each structural plate is supported externally by a surrounding external wound fiberglass reinforcement, in order to withstand higher operating pressures. The approach of imposing a tight-fitting external support around the external periphery of structural plates is best suited to circular shapes, such as that contemplated in U.S. Pat. No. 7,332,063. However, for large structural plates with complex irregular shapes, this type of external support would be less effective and more difficult and expensive to install.

Thus, what is needed is a simple, easily-implemented, cost effective approach to reinforcement of individual structural plates for electrolyser modules and electrolyser stacks, especially large-scale electrolyser modules and electrolyser stacks, in order to enable them to operate at higher pressures.

SUMMARY OF THE INVENTION

An electrolyser module comprising a plurality of structural plates each having a sidewall extending between opposite end faces with a half cell chamber opening and at least two degassing chamber openings extending through said structural plate between the opposite end faces. The structural plates are arranged in face to face juxtaposition between opposite end pressure plates. Each half cell chamber opening at least partially houses electrolytic half cell components comprising at least an electrode, a bipolar plate in electrical communication with the electrode, and a membrane communicating with the electrode for providing ionic conduction. The structural plates and half cell components define an array of series connected electrolytic cells surmounted by at least one degassing chamber. The structural plates define, at least when in face to face juxtaposition, passages for fluid flow inside said electrolyser module. The electrolyser module further comprises internal reinforcing means mounted to at least some of the structural plates for mitigating outward displacement of the structural plates. At least the structural plates to which internal reinforcing means are mounted further define, at least when in face to face juxtaposition, holding features in their front face or in their back face for locating and holding at least part of one or more internal reinforcing means.

A structural plate for an electrolyser module having a sidewall extending between opposite end faces with a half cell chamber opening and two or more degassing chamber openings extending through said structural plate between said opposite end faces. The structural plate defines, at least when in face to face juxtaposition with another structural plate, an end pressure plate or an intermediate pressure plate, passages for fluid flow inside the electrolyser module. The structural plate further defines, at least when in face to face juxtaposition with another structural plate, an end pressure plate or an intermediate pressure plate, holding features in its front face or in its back face for locating and holding at least part of one or more internal reinforcing means.

An electrolyser stack for comprising a plurality of structural plates each having a sidewall extending between opposite end faces with a half cell chamber opening, at least two header flow passage openings and at least one footer flow passage opening extending through said structural plate between said opposite end faces. The structural plates are arranged in face to face juxtaposition between opposite end pressure plates. Each half cell chamber opening at least partially houses electrolytic half cell components comprising at least an electrode, a bipolar plate in electrical communication with the electrode, and a membrane communicating with the electrode for providing ionic conduction. The structural plates and half cell components define an array of series connected electrolytic cells. The structural plates define, at least when in face to face juxtaposition, passages for fluid flow inside the electrolyser stack. The electrolyser stack further comprises internal reinforcing means mounted to at least some of the structural plates for mitigating outward displacement of the structural plates. At least the structural plates to which internal reinforcing means are mounted further define, at least when in face to face juxtaposition, holding features in their front face or in their back face for locating and holding at least part of one or more internal reinforcing means.

DESCRIPTION OF DRAWINGS

Preferred embodiments of the present invention are described below with reference to the accompanying illustrations in which.

DESCRIPTION OF PREFERRED EMBODIMENTS

In the present invention, internal reinforcing means mounted to at least some of the structural plates are used to increase the pressure holding capability of an electrolyser stack or electrolyser module, while at the same time enabling reduction in plastic material requirements and improving the creep resistance and part lifetime. The internal reinforcing means have significantly better mechanical properties (e.g., significantly higher strength and elastic modulus) than the plastic or fiber-reinforced plastic material of the structural plates, and preferably are easily installed, readily available, and low cost. The internal reinforcing means preferably are held in internal holding features defined by the faces of the structural plates, at least when in face to face juxtaposition.

Figure 1:
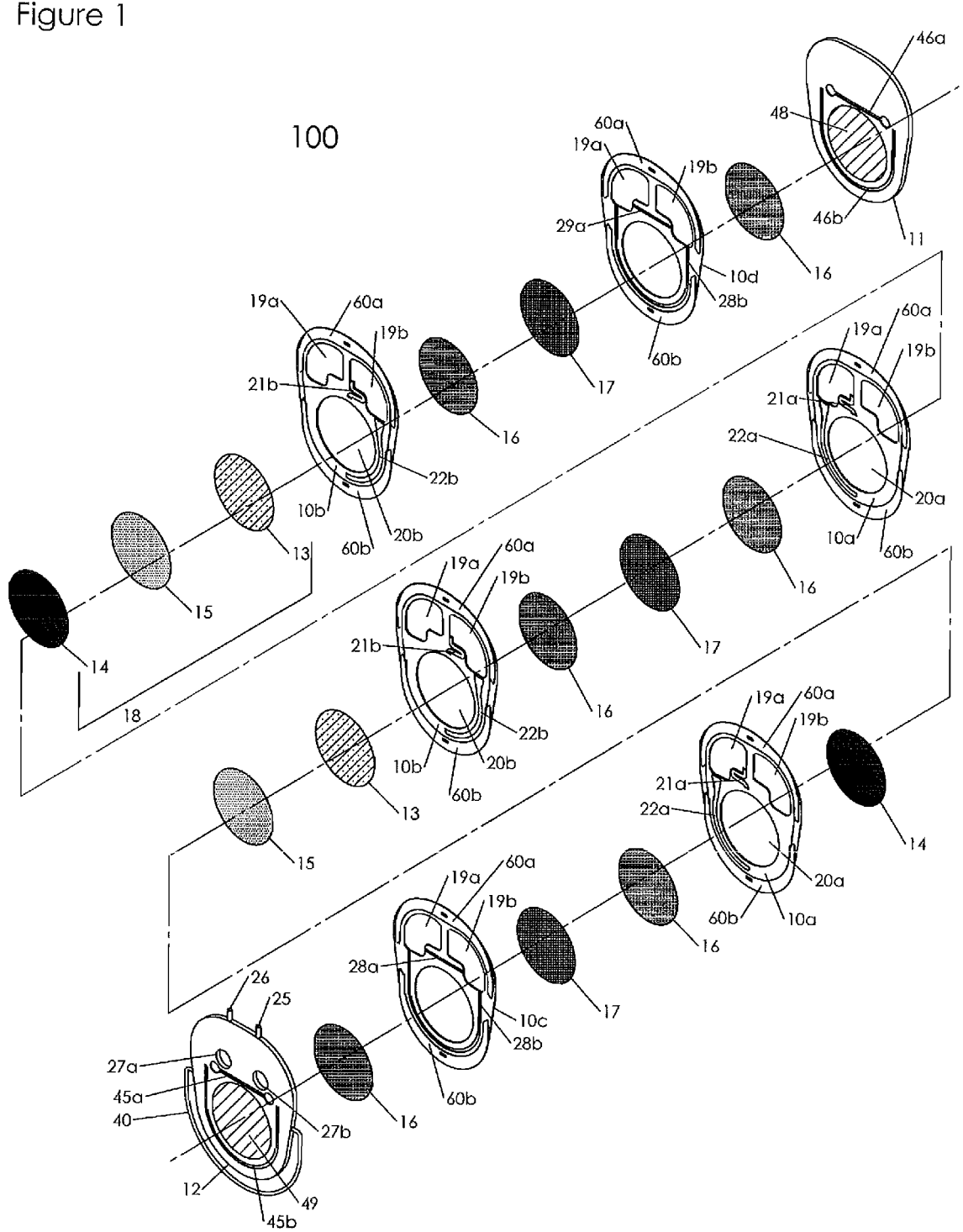
FIG. 1 is an exploded view of about half of an alkaline electrolyser module in accordance with the present invention.

An alkaline electrolyser module in accordance with an aspect of the present invention is shown generally at 100 in FIG. 1. FIG. 1 shows about half of an alkaline electrolyser module with 4 cells for illustrative purposes only; the other half of the electrolyser module would be a mirror image (on either side of feature 12, which in this case represents the midpoint of the electrolyser module). In practice, typically greater numbers of cells would be incorporated. Alkaline electrolyser module 100 includes structural plates 10, end pressure plates 11, anodes 13, cathodes 14, membranes 15, current carriers 16, bipolar plates 17, and optionally, one or more intermediate pressure plates 12 interspersed between structural plates along the length of the electrolyser module. The structural plates 10, end pressure plates 11 and intermediate pressure plates 12 comprise at least a body having a sidewall extending between opposite end faces. There are two main types of structural plates 10: cathode structural plates 10a and anode structural plates 10b. Additionally, special structural plates 10c and 10d can optionally be used on either side of the one or more optional intermediate pressure plate 12 and also optionally adjacent to either or both of the end pressure plates 11, respectively, e.g., to help to accommodate cooling conduits (e.g., cooling tubes or cooling coils). (As used herein, the term "plate" refers to structural plates, special structural plates, end pressure plates and intermediate pressure plates.) Suitable seals (e.g., o-ring gaskets, not shown) also are understood to be included. In the embodiment shown in FIG. 1, each structural plate 10a and 10b and special structural plate 10c and 10d holds two internal reinforcing means 60a and 60b as inserts in holding features located on the front faces of the structural plates. Other configurations are possible; for example, adjacent structural plates may share a set of one or more internal reinforcing means, which are "sandwiched" between the adjacent structural plates, one having holding features for the internal reinforcing means on its front face, the other having holding features on its back face. Additional variations also can be considered; for example, all of the structural plates which are reinforced can have holding features for the internal reinforcing means on their back faces, or on both their front faces and back faces. Furthermore, not all of the structural plates may necessarily require internal reinforcing means; for example, if special structural plates are used, especially at moderate pressures, they may not require internal reinforcing means, since they lack fluid flow passages (i.e., they contain more material), and also they are inherently reinforced to some extent by the adjacent end pressure plate 11 or intermediate pressure plates 12. Accordingly, some of the structural plates, e.g., one or more special structural plates, may be made used without internal reinforcing means. Also, structural plates adjacent to an end pressure plate or an intermediate pressure plate may be directly mechanically reinforced by embedding them into the adjacent end pressure plate or intermediate pressure plate. However, there is little benefit to not utilizing the internal reinforcing means, since they increase part performance and lifetime at relatively little additional cost.

Alkaline electrolyser module 100 thus comprises a plurality of electrolysis cells 18 and associated degassing chambers 19. The electrolysis cells 18 preferably are located at the bottom part of the electrolyser module 100, and the associated degassing chambers 19 preferably are located at the top part of the electrolyser module 100, surmounting the electrolysis cells 18. The electrolysis cells comprise cathode and anode half cell chambers 20a and 20b defined by two adjacent structural plates, as well as a cathode 14, an anode 13, a membrane 15, and current collectors 16. More than one current collector 16 can be used per half cell chamber 20a and/or 20b. Bipolar plates 17 physically separate and provide electrical communication between adjacent cells. The membrane is in communication with each of the electrodes for providing ionic conduction. End pressure plates 11 and intermediate pressure plates 12 optionally include suitably coated or plated electrically conducting areas or separate parts 48 and 49, respectively, to facilitate electrical current flow through the portions of the end pressure plates and intermediate pressure plates corresponding to the active cell area. End pressure plates 11 and intermediate pressure plates 12 can be made of, e.g., one or more of steel, stainless steel, plated or coated steel, plated or coated stainless steel, nickel and nickel alloy, or other metals, plated metals or coated metals, or non-plated (the term "metals" is to be understood to include both metals and metal alloys).

As shown in FIG. 1, each cathode half cell chamber 20a is in direct fluid communication with the hydrogen degassing chamber 19a via a gas-liquid flow passage 21a, and a degassed liquid flow passage 22a. Similarly, each anode half cell chamber 20b is in direct fluid communication with the oxygen degassing chamber 19b via a gas-liquid flow passage 21b, and a degassed liquid flow passage 22b. Separated hydrogen gas exits through hydrogen gas discharge passage 25, which extends radially through to the hydrogen degassing chamber; separated oxygen gas exits through separated oxygen gas discharge passage 26, which extends radially through to the oxygen degassing chamber. Gas discharge passages 25 and 26 typically are contained in the intermediate pressure plate 12, or in one or both of the end pressure plates 11. Feed water is introduced to one or both of the hydrogen and oxygen degassing chambers 19a and 19b through feed water passages (not shown), which also typically are located in the intermediate pressure plate 12 or in one or both of the end pressure plates 11. Electrical current is supplied to the cell portion of electrolyser module 100 by, for example, a DC power supply, most commonly via positive and negative electrical connections to end pressure plates 11, and optionally with a non-current carrying electrical ground connection to intermediate pressure plate 12 at the midpoint of electrolyser module 100.

Figure 2:
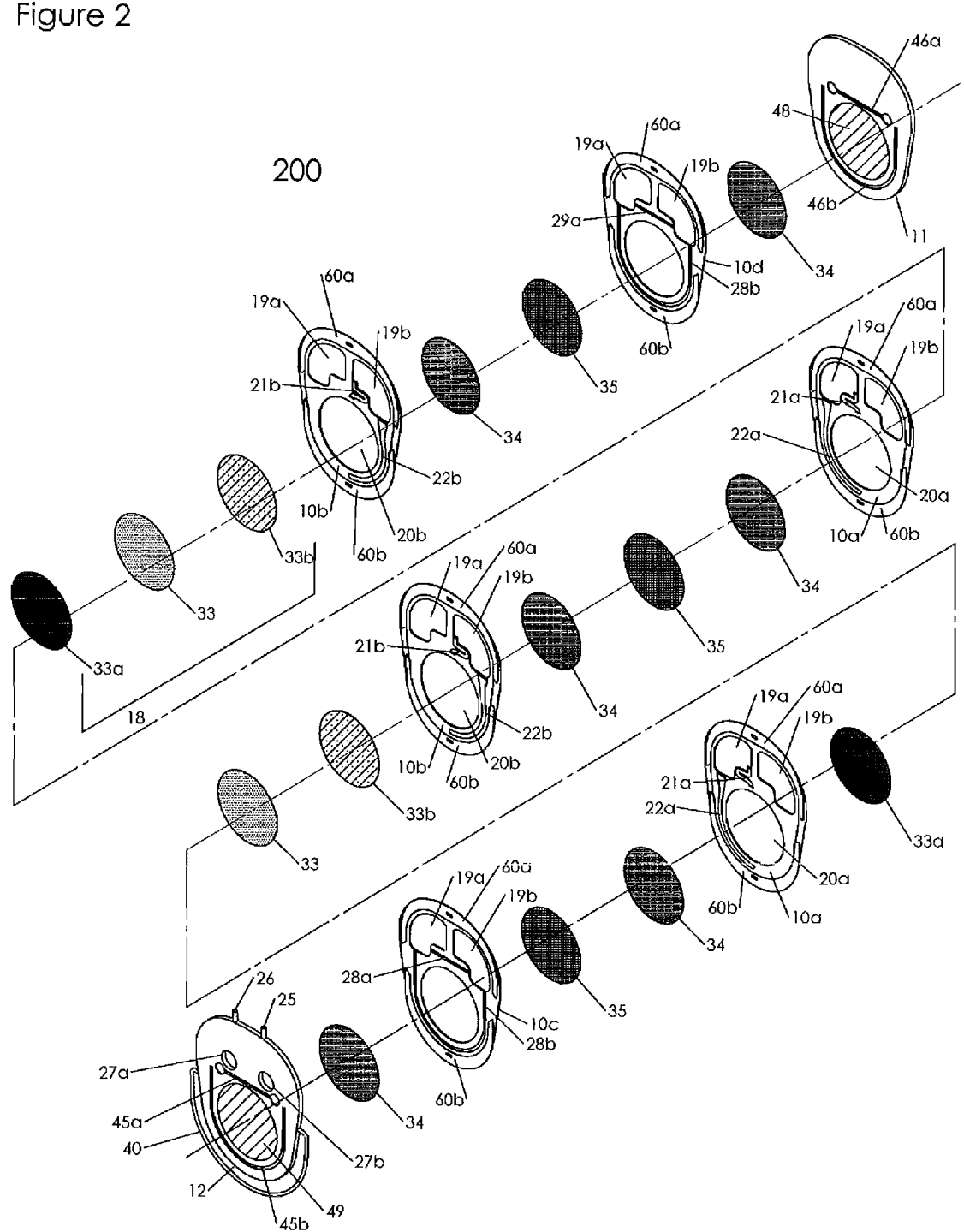
FIG. 2 is an exploded view of about half of a PEM electrolyser module in accordance with the present invention.

A PEM electrolyser module in accordance with an aspect of the present invention is shown generally at 200 in FIG. 2. FIG. 2 shows about half of a PEM electrolyser module with 4 cells for illustrative purposes only; the other half of the electrolyser module would be a mirror image (on either side of feature 12, which in this case represents the midpoint of the electrolyser module). In practice, typically greater numbers of cells would be incorporated. PEM electrolyser module 200 includes structural plates 10, end pressure plates 11, membrane-electrode assemblies (MEA's) 33, optionally electrode backing layers 33a and 33b, current carriers 34, bipolar plates 35 and optionally, one or more intermediate pressure plates 12. The structural plates 10, end pressure plates 11 and intermediate pressure plates 12 comprise at least a body having a sidewall extending between opposite end faces. A typical MEA consists of a membrane and electrodes coated onto opposite faces of the membrane; a cathode coated onto one face of the membrane, and an anode coated onto the opposite face of the membrane. Thus, the membrane is in communication with each of the two electrodes for providing ionic conduction. A typical MEA consists of a membrane, a cathode coated onto one side of the membrane, and an anode coated onto the other side of the membrane. In some embodiments, the electrode backing layers 33a and 33b also can be incorporated into the MEA 33. In the embodiment shown in FIG. 2, there are two main types of structural plates 10: cathode structural plates 10a and anode structural plates 10b. Additionally, special structural plates 10c and 10d can optionally be located adjacent to the optional intermediate pressure plate 12 and the end pressure plates 11, respectively, e.g., to help accommodate cooling conduits (e.g., cooling tubes or cooling coils). Suitable seals (e.g., o-ring gaskets, not shown) also are understood to be included. In the embodiment shown in FIG. 2, each structural plate 10a and 10b and special structural plate 10c and 10d also holds two internal reinforcing means 60a and 60b in holding features, which may be recesses or grooves, located on the front faces of the structural plates. Other configurations are possible; for example, adjacent structural plates may share a set of one or more internal reinforcing means, which are "sandwiched" between the adjacent structural plates, one having holding features for the internal reinforcing means on its front face, the other having holding features on its back face. Additional variations also can be considered; for example, all of the structural plates which are reinforced can have holding features for the internal reinforcing means on their back faces, or on both their front faces and back faces. Furthermore, not all of the structural plates may necessarily require internal reinforcing means; for example, if special structural plates are used, especially at moderate pressures, they may not require internal reinforcing means, since they lack fluid flow passages (i.e., they contain more material), and also they are inherently reinforced to some extent by the adjacent end pressure plate 11 or intermediate pressure plates 12. Accordingly, some of the structural plates, e.g., one or more special structural plates, may be made used without internal reinforcing means. Also, structural plates adjacent to an end pressure plate or an intermediate pressure plate may be directly mechanically reinforced by embedding them into the adjacent end pressure plate or intermediate pressure plate. However, there is little benefit to not utilizing the internal reinforcing means, since they increase part performance and lifetime at relatively little additional cost.

PEM electrolyser module 200 thus comprises a plurality of electrolysis cells and associated hydrogen degassing chamber 19a and oxygen degassing chamber 19b. The PEM electrolysis cells 38 preferably are located at the bottom part of the electrolyser module 200, and the associated degassing chambers 19a and 19b preferably are located at the top part of the electrolyser module 200, surmounting the PEM electrolysis cells 38. The electrolysis cells comprise cathode and anode half cell chambers 38a and 38b defined by two adjacent structural plates, as well as a MEA 33, electrode backing layers 33a and 33b, and the current collectors 34. Bipolar plates 35 physically separate and provide electrical communication between adjacent cells. End pressure plates 11 and intermediate pressure plates 12 optionally include suitably coated or plated electrically conducting areas or separate parts 48 and 49, respectively, to facilitate electrical current flow through the portions of the end pressure plates and intermediate pressure plates corresponding to the active cell area. End pressure plates 11 and intermediate pressure plates 12 can be made of, e.g., one or more of steel, stainless steel, plated steel, plated stainless steel, or other metals, plated metals or coated metals (the term "metals" is to be understood to include metals and metal alloys).

As shown in FIG. 2, each cathode half cell chamber 20a is in direct fluid communication with the hydrogen degassing chamber 19a via a gas-liquid flow passage 21a, and a degassed liquid flow passage 22a. Similarly, each anode half cell chamber 20b is in direct fluid communication with the oxygen degassing chamber 19b via a gas-liquid flow passage 21b, and a degassed liquid flow passage 22b. Separated hydrogen gas exits through hydrogen gas discharge passage 25, which extends radially through to the hydrogen degassing chamber; separated oxygen gas exits through separated oxygen gas discharge passage 26, which extends radially through to the oxygen degassing chamber. Gas discharge passages 25 and 26 typically are contained in the intermediate pressure plate 12, or in one or both of the end pressure plates 11. Feed water is introduced to one or both of the hydrogen and oxygen degassing chambers 19a and 19b through feed water passages (not shown), which also typically are located in the intermediate pressure plate 12 or in one or both of the end pressure plates 11. Electrical current is supplied to the cell portion of electrolyser module 200 by, for example, a DC power supply, most commonly via positive and negative electrical connections to end pressure plates 11, and optionally with a non-current carrying electrical ground connection to intermediate pressure plate 12 at the midpoint of electrolyser module 200.

If the electrolyser module 100 or 200 is to be operated with substantially equal oxygen side and hydrogen side pressures, the bottom portions of degassing chambers 19a and 19b can be in fluid (liquid only) communication, e.g., via one or more liquid communication passages. Examples of preferred embodiments of liquid communication passages are: internal passages contained in one of more of intermediate pressure plate 12, end pressure plates 11 and special structural plates 10c and 10d; passages formed by surface channels in at least one of the opposite end faces of one or more of intermediate pressure plate 12 and end pressure plates 11, at least when in face-to-face juxtaposition with adjacent special structural plates 10c and 10d, respectively; passages formed by surface channels in at least one of the opposite end faces of one or more of special structural plates 10c and 10d, at least when in face-to-face juxtaposition with adjacent intermediate pressure plate 12, end pressure plate 11, respectively, or structural plates 10a and 10b; and, external passages, comprised of, e.g., tube or pipe, in liquid communication with degassing chambers 19a and 19b via internal passages in intermediate pressure plate 12 or end pressure plate 11. Illustrative examples are shown in FIGS. 1 and 2: (i) features 28a and 28b in special structural plates 10c; (ii) features 29a and 29b in special structural plates 10d; and, (iii) feature 40, which is tube or pipe in liquid communication with the lower portion of the hydrogen degassing chamber and the oxygen degassing chamber via respective interior passages in intermediate pressure plate 12; (iv) features 45a and 45b in intermediate pressure plate 12 and features 46a and 46b in end pressure plate 11. Features 28a, 28b, 29a, 29b, 45a, 45b, 46a and 46b are shown as surface channels, but could be corresponding internal passages. It is to be understood that the actual path of the liquid communication passages and the relative size of the liquid communication passages need not be exactly as shown in the illustrative cases of FIGS. 1 and 2, and further that appropriate combinations of features 28a, 28b, 29a, 29b, 40, 45a, 45b, 46a and 46b may be used. In certain embodiments, some of features 28a and 28b, 29a and 29b, and 45a and 45b can be included on both sides of special structural plates 10c and 10b, and intermediate pressure plate 12, respectively. Such liquid communication between degassing chambers 19a and 19b may facilitate (near) equalization of the liquid levels in the degassing chambers, and thereby the hydrogen side and oxygen side pressures during operation, and further, may facilitate rapid, passive response for correction of operational upsets.

Figure 3:
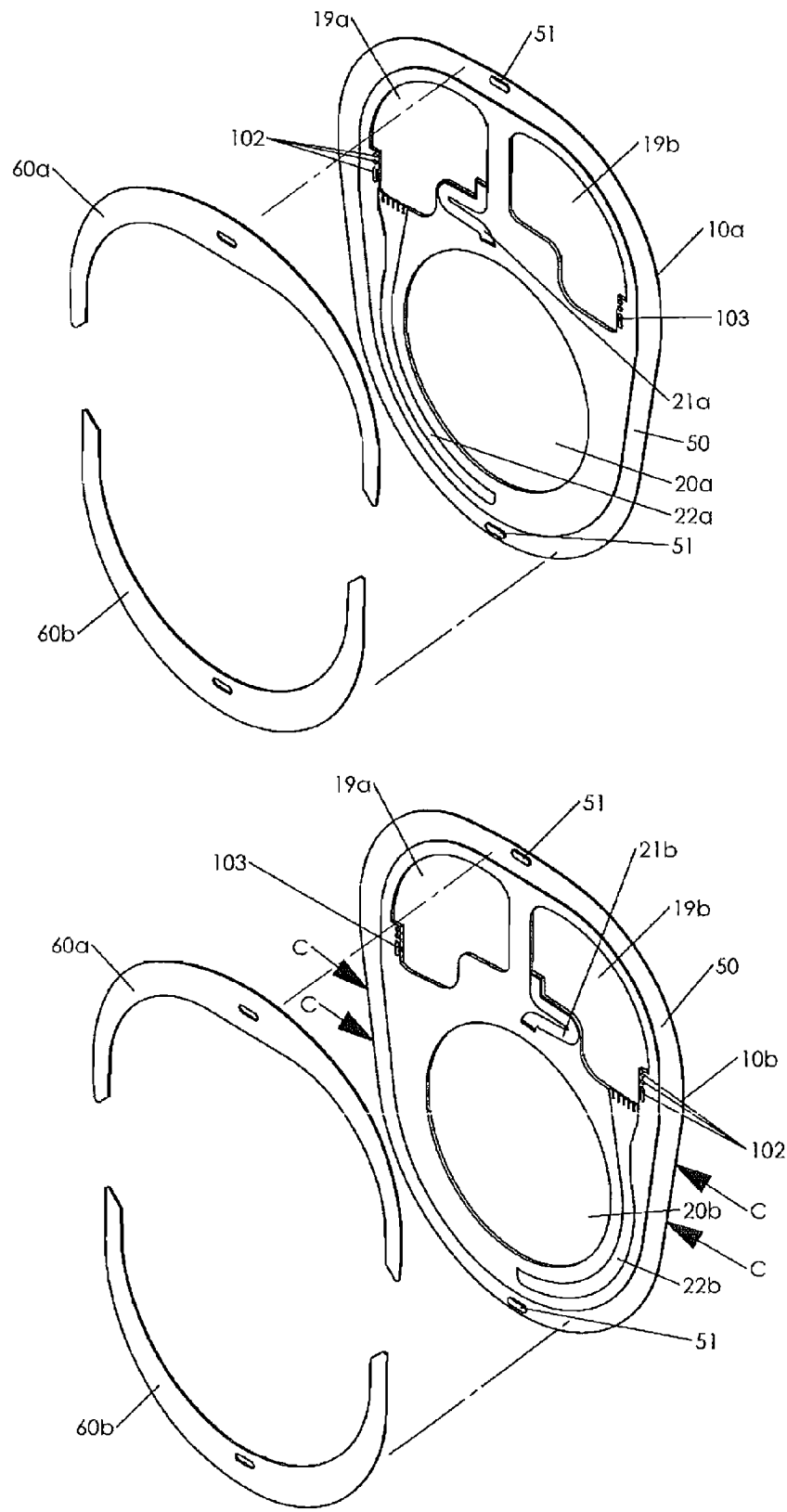
FIG. 3 is an isometric view showing the front faces of an embodiment of structural plates and internal reinforcing means for an electrolyser module, as well as a preferred embodiment of feed water addition features in accordance with the present invention.

Structural plates for an electrolyser module in accordance with an aspect of the present invention are shown in FIG. 3. FIG. 3 shows a preferred embodiment in which structural plate 10a defines one half cell chamber opening 20a and two degassing chamber openings 19a and 19b; it is understood that each structural plate can define more than one of each type of opening. The structural plates define at least when in face to face juxtaposition, passages for fluid flow inside the electrolyser stack. Structural plate 10a defines one or more gas-liquid flow passages 21a, which provide direct fluid communication between the top part of the half cell chamber opening 20a to one of the degassing chamber openings 19a and 19b. Structural plate 10a further defines one or more degassed liquid flow passages 22a, which provide direct fluid communication between the bottom part of the half cell chamber opening 20a to one of the degassing chamber openings 19a and 19b. Gas-liquid flow passages 21 become interior passages (slot-shaped through holes) near the top of half cell chamber opening 20; similarly, degassed liquid flow passages 22 become interior passages (slot-shaped through holes) near the bottom of half cell chamber opening 20. Structural plate 10a also includes holding features (not shown) for locating and holding seals (e.g., o-ring gaskets) and holding features 50 for locating and holding one or more internal reinforcing means 60, at least when in face to face juxtaposition with another structural plate, an end pressure plate, or an intermediate pressure plate. The holding features 50 may be a recess or groove in which the reinforcing means 60a and 60b may fit. In the preferred embodiment illustrated in FIG. 3, two internal reinforcing means 60a and 60b comprising curved inserts are used; one spanning the top portion of the structural plate, and one spanning the bottom portion of the structural plate. Concave curving of the peripheral edges of the structural plate, at the middle of both side portions and at the middle of the top portion of the part, is used to reduce side to side deflection by changing the distortion pattern of the part. The structural plates are made of a suitable electrically insulating plastic or fiber-reinforced plastic. Examples of suitable plastics include polyoxymethylene (POM), polypropylene, polyphenylene oxide (PPO), polyphenylene sulphide (PPS) and the like, and in particular, polysulfone. Structural plates 10a and 10b shown in FIG. 3 correspond to cathode (hydrogen) structural plates 10a and anode structural plates 10b in FIGS. 1 and 2.

FIG. 3 also shows features for a particularly preferred feed water addition system, which comprises entry passages in one or more of the end pressure plates 11 and/or one or more intermediate pressure plates 12, which are in fluid communication on one end with an external feed water source, and on the other end with one or more feed water manifolds formed by feed water openings 102 in structural plates 10. Feed water openings 102 in turn further fluidly communicate in one or more of the structural plates 10 with one or more of the first and second degassing chambers 19a and 19b via water flow passages 103. Typically, water flow passages 103 in cathode structural plates 10a are in fluid communication with hydrogen degassing chamber 19a, and water flow passages 103 in anode structural plates 10b are in fluid communication with oxygen degassing chamber 19b, or vice-versa, such that water flow passages connect to opposite degassing chambers in adjacent structural plates. Preferably, separate feed water passages are used to add liquids to hydrogen degassing chamber 19a and oxygen degassing chamber 19b. It is to be understood that the structural plates shown in FIG. 3 do not have to include features 102 and 103, and conversely that any of the structural plates shown in the other Figures can additionally comprise features 102 and 103.

The internal reinforcing means for all the embodiments described herein have better mechanical properties (strength, elastic modulus) than the plastic or fiber reinforced plastic comprising the bodies of the structural plates, and preferably are easily installed, readily available, and low cost.

Figure 4:
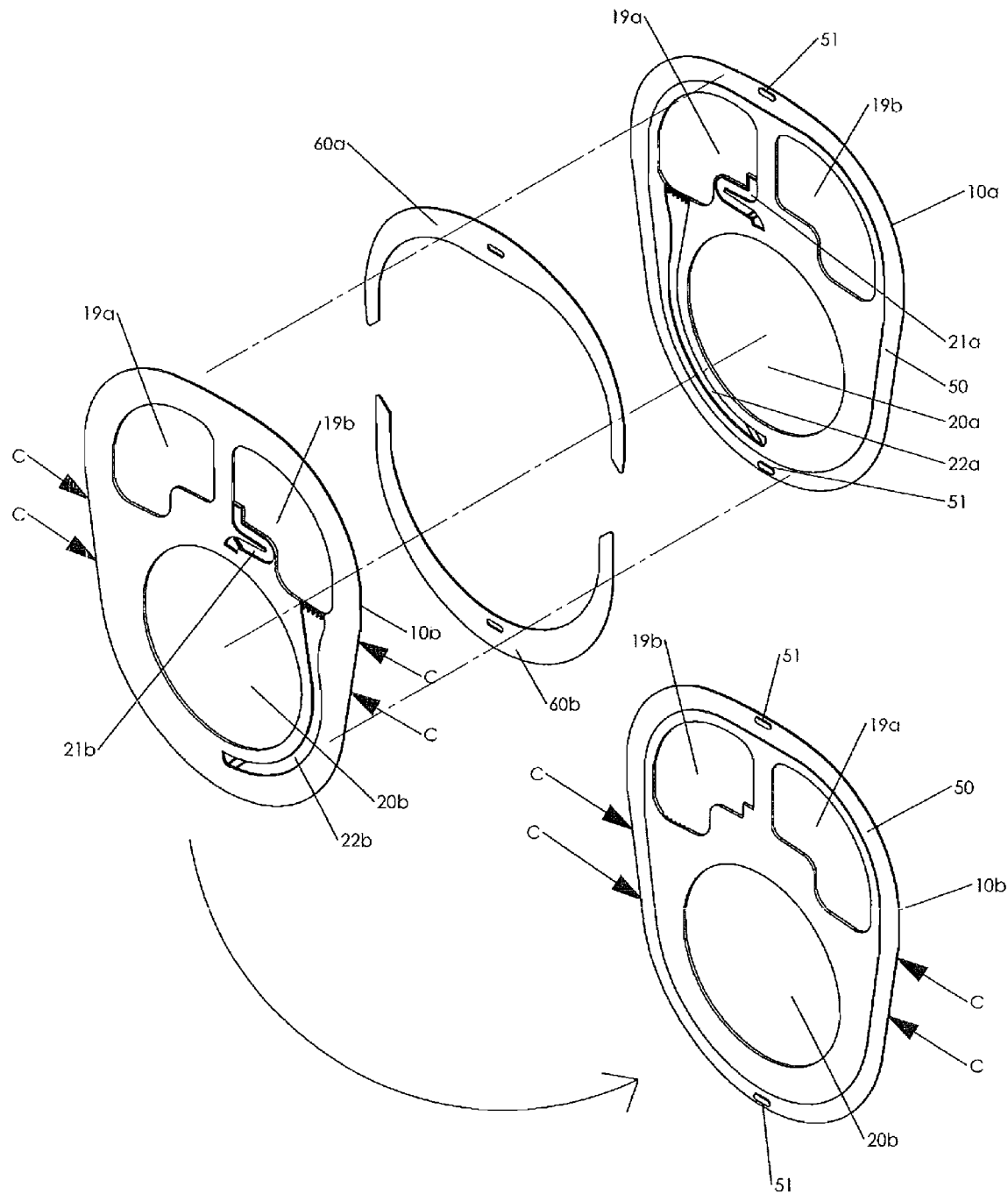
FIG. 4 is an isometric view showing the front faces and a back face of an alternative embodiment of structural plates and internal reinforcing means for an electrolyser module in accordance with the present invention.

In the preferred embodiments above, curved inserts are used as the internal reinforcing means. Two internal reinforcing means are used per structural plate; one spanning the top portion of each structural plate, and one spanning the bottom portion of each structural plate, as illustrated in FIG. 3 (60a and 60b). Holding features 50 for mounting the internal reinforcing means are located on the front faces of the structural plates for relative ease of assembly, but alternatively can be located on the back faces of the structural plates, or on the front side and then the back side of alternate structural plates, or on both faces of the structural plates. FIG. 4 shows an example of an alternative embodiment in which holding features 50 are located on the front face of structural plate 10a and on the back face of the next structural plate 10b, with a single set of internal reinforcing means shared between adjacent structural plates. A view of the back face of structural plate 10b (180° rotational view) is shown separately at the bottom of FIG. 4 for clarity. The internal reinforcing means 60a and 60b are straightforwardly installed during assembly of the electrolyser module by inserting them in the holding features 50. The holding features 50 optionally include one or more pins at through-holes in the internal reinforcing means (51 in FIG. 3), connected to the structural plate, to keep the internal reinforcing means 60a and 60b mounted in place during assembly of the electrolyser module.

Although continuous internal reinforcing means spanning the full periphery of each structural plate can be used, the use of two separate internal reinforcing means allows for reduced part complexity, lower cost, and easier handling and installation. Differential thermal expansion is allowed for by using two discontinuous internal reinforcing means, allowing for thermal growth along the length of the internal reinforcing means. The internal reinforcing means are preferably comprised of, but not limited to, metal with or without plating or coating (e.g., polymer-coated metal), and most preferably, at least for alkaline electrolyser modules or stacks, steel or stainless steel, or optionally polymer-coated steel or stainless steel. (The term "metal" is to be understood to include both metals and metal alloys.) The material comprising the internal reinforcing means must provide not only sufficient strength and elastic modulus, but also appropriate chemical resistance; for example, aluminum or aluminum alloys, copper or copper alloys, and titanium or titanium alloys are not preferred for use in alkaline electrolyser modules or stacks, but may be considered for use in PEM electrolyser modules or stacks as lighter weight alternatives. An example of a suitable internal reinforcing means thickness is 6 mm (assuming it is mounted in a single structural plate). The internal reinforcing means support and mitigate outward displacement of the polymeric structural plate material over time. The internal reinforcing means also enable minimization of plastic material around the periphery of the structural plates, reducing cost, part size, and shot size for injection molding.

In a particularly preferred embodiment, the tendency for asymmetrical structural plates to experience displacement and corresponding stress in a certain direction can be counteracted by counter-stressing the structural plate in the opposite direction during module assembly. For example, the structural plate shown in FIG. 3 can be compressed radially inwardly in the horizontal direction at certain locations (near the middle of the structural plate, at the locations indicated as "C" in this case) during module assembly, with the reinforcing means correspondingly slightly inwardly bent at those locations, such that the reinforcing means tend to counteract the tendency for outward displacement through this area. This approach has been found to significantly reduce stresses in the complex fluid flow features in the middle of the structural plate.

Some or all of the holding features for the reinforcing means can optionally remain unused, in accordance with the pressure containment requirements. However, for lower pressure containment requirements (e.g., 5-10 bar), inclusion of the reinforcing means can ensure long-term mechanical integrity of the structural plates with relatively little increased initial cost.

Example 1

Figure 5:
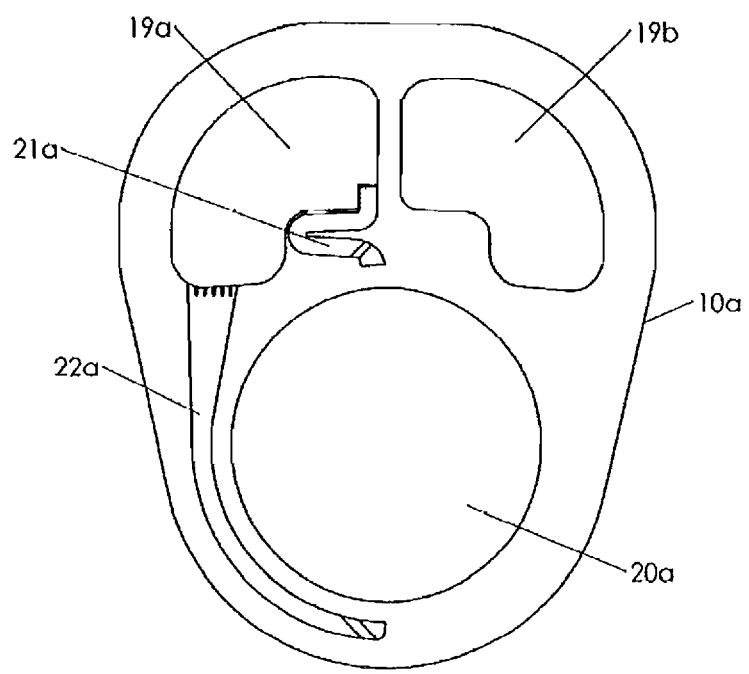
FIG. 5 is a front elevation showing the front face of an embodiment of a structural plate without internal reinforcing means for an electrolyser module in accordance with a prior design; and, FIG. 6 is a front elevation showing the front face of an embodiment of a structural plate and a continuous internal reinforcing means for an electrolyser module in accordance with the present invention.

Stresses in a structural plate for an electrolyser module according to a prior design were modeled by finite element analysis (FEA). The general structural plate configuration was as shown in FIG. 5. The outermost dimensions of the structural plate were 1505 mm wide, 1,828 mm high, and 12 mm thick. The half cell chamber opening was 6,000 cm$^2$. The structural plate was made of polysulfone. Modeling at 25 bar internal pressure showed an unacceptable stress distribution with high stresses and displacements.

Example 2

Figure 6:
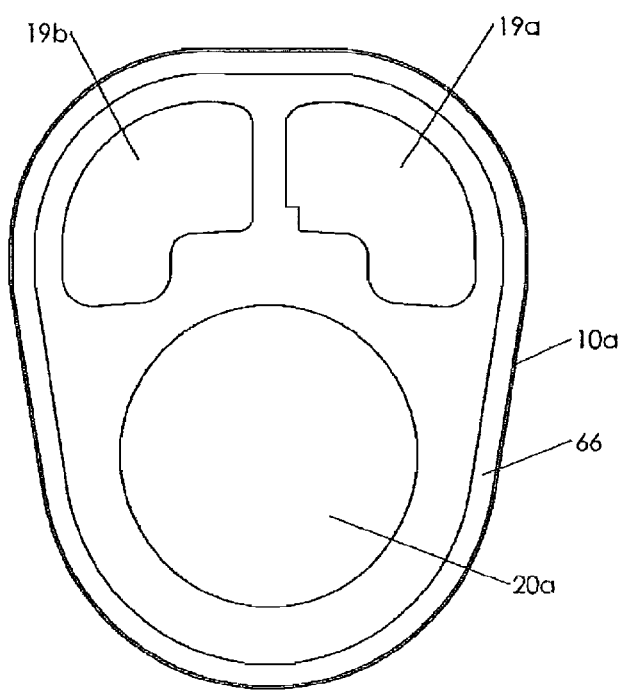
Figure 6:
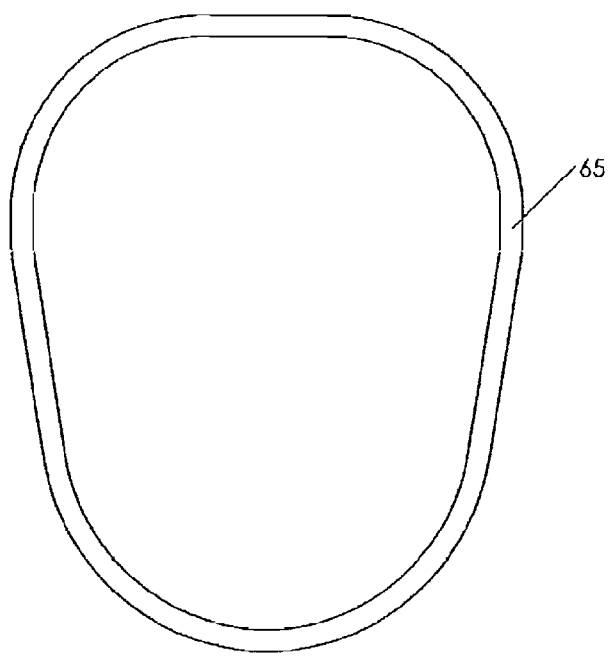

Stresses in a structural plate for an electrolyser module according to the present invention were modeled by FEA. The general structural plate and internal reinforcing means configuration as shown in FIG. 6. The internal reinforcing means 65 was a single, 6 mm thick continuous steel insert, with a corresponding holding feature 66 around the periphery of the front face of the structural plate, as shown in FIG. 6. The outermost dimensions of the structural plate were 1,513 mm wide, 1830 mm high, and 12 mm thick. The half cell chamber opening was 6,000 cm$^2$. The structural plate was made of polysulfone. The amount of polysulfone used was 35% less than the prior design part shown in FIG. 5. Modeling at 25 bar internal pressure showed an acceptable stress distribution with low stresses and displacement. Although the continuous internal reinforcement provided acceptably low stresses and displacements, it would be costly to fabricate with the required tolerances, cumbersome, and difficult to fit into the holding features in the structural plate.

Example 3

Stresses in a structural plate for an electrolyser module according to the present invention were modeled by FEA. The general structural plate and internal reinforcing means configuration was as shown in FIG. 3. The internal reinforcing means 60a and 60b comprised two 6 mm thick curved steel inserts as shown in FIG. 3; one spanning the top portion of the structural plate, and one spanning the bottom portion of the structural plate. The holding features for the internal reinforcing means were in the front side of the structural plate, as shown in FIG. 3. The outermost dimensions of the structural plate were 1513 mm wide, 1,851 mm high, and 12 mm thick. The half cell chamber opening was 6,000 cm$^2$. The structural plate was made of polysulfone. The amount of polysulfone used was 38% less than the prior art part shown in FIG. 5. Modeling at 25 bar internal pressure showed an acceptable stress distribution with low stresses and displacement. The structural plates were compressed inward 0.040 inches at the four points indicated as "C" in FIG. 3, in order to further reduce stresses at the complex fluid flow features in FIG. 3. The maximum stresses were 41% lower than those in Example 2. Corresponding modeling simulating creep properties after 100,000 hours indicated little change in the stresses and displacement.

It is contemplated that the water electrolyser module of the present invention be used for large scale (e.g., MW scale) applications.

Although the embodiments above have focussed on electrolyser modules, the same principles can apply to an electrolyser stack. For example, an electrolyser stack comprises a plurality of structural plates each having a sidewall extending between opposite end faces with a half cell chamber opening, with at least two header flow passage openings and at least one footer flow passage opening extending through each structural plate between its opposite end faces. The structural plates are arranged in face to face juxtaposition between opposite end pressure plates. Each half cell chamber opening at least partially houses electrolytic half cell components comprising at least an electrode, a bipolar plate in electrical communication with the electrode, and a membrane communicating with the electrode for providing ionic conduction. The structural plates and half cell components therefore define an array of series connected electrolytic cells. The structural plates also define, at least when in face to face juxtaposition, passages for fluid flow inside the electrolyser stack. The electrolyser stack further comprises internal reinforcing means mounted to at least some of the structural plates for mitigating outward displacement of the structural plates. At least the structural plates to which internal reinforcing means are mounted further define, at least when in face to face juxtaposition, holding features for locating and holding at least part of one or more internal reinforcing means.

The foregoing description of the preferred embodiments and examples of the apparatus and process of the invention have been presented to illustrate the principles of the invention and not to limit the invention to the particular embodiments illustrated. It is intended that the scope of the invention be defined by all of the embodiments encompassed within the claims and/or their equivalents.

The invention claimed is:

1. An electrolyser module comprising a plurality of structural plates each having a sidewall extending between opposite end faces with a half cell chamber opening and at least two degassing chamber openings extending through said structural plate between said opposite end faces;
    said structural plates being arranged in face to face juxtaposition between opposite end pressure plates,
    each said half cell chamber opening at least partially housing electrolytic half cell components comprising at least an electrode, a bipolar plate in electrical communication with said electrode, and a membrane communicating with said electrode for providing ionic conduction, said structural plates and half cell components defining an array of series connected electrolytic cells surmounted by at least one degassing chamber;
    said structural plates defining, at least when in face-to-face juxtaposition, passages for fluid flow inside said electrolyser module;
    said electrolyser module further comprising at least one internal reinforcing member mounted to at least one of said structural plates for mitigating outward displacement of said structural plates;
    at least said at least one of said structural plates further defining holding features in at least one of a front face and a back face of said structural plates for locating and holding at least part of said at least one internal reinforcing member.

2. An electrolyser module as claimed in claim 1, further comprising at least one intermediate pressure plate, comprising at least a body, interspersed between said structural plates along a length of said electrolyser module.

3. An electrolyser module as claimed in any of claims 1 and 2, wherein said at least one internal reinforcing member comprises two curved inserts mounted to each of said at least some of said structural plates; one spanning a top portion of each of said at least some of said structural plates, and one spanning a bottom portion of each of said at least some of said structural plates.

4. An electrolyser module as claimed in any of claims 1 and 2, wherein said structural plates are compressed radially inwardly at certain locations during assembly of said electrolyser module, with said at least one internal reinforcing member being correspondingly inwardly bent at said certain locations.

5. An electrolyser module as claimed in any of claims 1 and 2, further comprising at least one liquid communication passage for liquid communication between said at least first and second degassing chambers.

6. An electrolyser module as claimed in claim 2, further comprising at least one feed water passage passing through at least one of said end pressure plates and said at least one intermediate pressure plate, and then passing through said structural plates.

7. An electrolyser module as claimed in any of claims 1 and 2, wherein said structural plates are comprised of at least one of plastic and fiber-reinforced plastic.

8. An electrolyser module as claimed in claim 7, wherein said plastic is comprised of at least one of polysulfone, polyphenylene oxide, polyphenylene sulphide, polypropylene, and polyoxymethylene.

9. An electrolyser module as claimed in claim 7, wherein said at least one internal reinforcing member comprises inserts having significantly higher strength and elastic modulus than said at least one of plastic and fiber-reinforced plastic.

10. An electrolyser module as claimed in claim 9, wherein said at least one internal reinforcing member comprises at least one of metal, plated metal, and polymer-coated metal.

11. An electrolyser module as claimed in claim 10, wherein said metal comprises at least one of steel, stainless steel, aluminum, aluminum alloy, copper, copper alloy, titanium and titanium alloy.

12. A structural plate for an electrolyser module having a sidewall extending between opposite end faces with a half cell chamber opening and at least two degassing chamber openings extending through said structural plate between said opposite end faces;
    said structural plate defining, at least when in face-to-face juxtaposition with at least one of another structural plate, an end pressure plate, and an intermediate pressure plate, passages for fluid flow inside said electrolyser module;
    said structural plate further defining, at least when in face to face juxtaposition with at least one of another structural plate, an end pressure plate, and an intermediate pressure plate, holding features in at least one of a front face and a back face of said structural plate for locating and holding at least part of one or more internal reinforcing members wherein the holding features are located outboard of the half cell chamber opening and the at least two degassing chamber openings.

13. An electrolyser stack comprising a plurality of structural plates each having a sidewall extending between opposite end faces with a half cell chamber opening, at least two header flow passage openings and at least one footer flow passage opening extending through said structural plate between said opposite end faces;
    said structural plates being arranged in face to face juxtaposition between opposite end pressure plates;
    each said half cell chamber opening at least partially housing electrolytic half cell components comprising at least an electrode, a bipolar plate in electrical communication with said electrode, and a membrane communicating with said electrode for providing ionic conduction, said structural plates and half cell components defining an array of series connected electrolytic cells;
    said structural plates defining, at least when in face-to-face juxtaposition, passages for fluid flow inside said electrolyser module;
    said electrolyser stack further comprising at least one internal reinforcing member mounted to at least one of said structural plates for mitigating outward displacement of said structural plates;
    at least said at least one of said structural plates further defining holding features in at least one of a front face and a back face of said structural plate for locating and holding at least part of said at least one internal reinforcing member.

14. An electrolyser stack as claimed in claim 13, further comprising at least one intermediate pressure plate, comprising at least a body, interspersed between said structural plates along a length of said electrolyser stack.

* * * * *